US009656629B2

(12) United States Patent
Groeneveld et al.

(10) Patent No.: US 9,656,629 B2
(45) Date of Patent: May 23, 2017

(54) TIMED INDEPENDENT VEHICLE SECURE COMPARTMENT ACCESS

(71) Applicant: Ford Global Technologies, LLC, Dearborn, MI (US)

(72) Inventors: Arie Groeneveld, Bloomfield, MI (US); Daniel M. King, Northville, MI (US); Steven Skikun, Commerce Township, MI (US); Robert Kern, Eastpointe, MI (US); William Michael Gardner, Novi, MI (US); Steven Erno, Novi, MI (US); Patricia Seashore, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 14/721,214

(22) Filed: May 26, 2015

(65) Prior Publication Data

US 2016/0347279 A1 Dec. 1, 2016

(51) Int. Cl.
*B60R 25/01* (2013.01)
*B60R 25/24* (2013.01)

(52) U.S. Cl.
CPC ............ *B60R 25/01* (2013.01); *B60R 25/245* (2013.01)

(58) Field of Classification Search
CPC ............ G07C 9/00309; G07C 9/00182; G07C 9/00007; G07C 2009/00793; G07C 9/00111; G07C 2009/00928; G07C 9/00944
USPC ....................................................... 340/5.64
See application file for complete search history.

(56) References Cited

U.S. PATENT DOCUMENTS

| 3,942,691 | A | | 3/1976 | Sisak | |
|---|---|---|---|---|---|
| 4,702,094 | A | | 10/1987 | Peterson | |
| 5,113,182 | A | * | 5/1992 | Suman | B60R 25/2081 307/10.2 |
| 5,808,375 | A | | 9/1998 | Armbruster et al. | |
| 5,959,540 | A | | 9/1999 | Walter | |
| 6,290,269 | B1 | * | 9/2001 | Bodley-Scott | E05B 81/25 292/216 |
| 7,106,171 | B1 | * | 9/2006 | Burgess | B60R 25/23 340/10.42 |
| 7,234,737 | B2 | | 6/2007 | Kalsi | |
| 8,350,670 | B2 | * | 1/2013 | Kelly | B60R 25/2081 340/426.16 |

(Continued)

FOREIGN PATENT DOCUMENTS

CN 203937620 11/2014

*Primary Examiner* — Mark Blouin
(74) *Attorney, Agent, or Firm* — Frank A. MacKenzie; Brooks Kushman P.C.

(57) ABSTRACT

An access system for a vehicle may include a controller. The controller may be configured to respond to receiving an unlock signal indicative of an unlock request by causing a compartment closure to unlock for a predetermined time. Or the controller may be configured to respond to receiving an unlock signal indicative of an unlock request and a vehicle operation signal indicative of a vehicle secure state by causing a compartment closure to unlock for a predetermined time. Upon expiration of the predetermined time, the controller may cause the compartment closure to lock. The controller may be configured to respond to receiving an unlatch signal indicative of an unlatch request during the predetermined time by causing the compartment closure to unlatch.

18 Claims, 2 Drawing Sheets

(56) References Cited

U.S. PATENT DOCUMENTS

| | | | | |
|---|---|---|---|---|
| 8,451,087 B2* | 5/2013 | Krishnan | ................... | B60J 5/04 |
| | | | | 292/221 |
| 2005/0242923 A1* | 11/2005 | Pearson | ............. | G07C 9/00309 |
| | | | | 340/5.62 |
| 2006/0067259 A1* | 3/2006 | Yousuf | ................ | H04L 12/4641 |
| | | | | 370/310 |

* cited by examiner

TIMED INDEPENDENT VEHICLE SECURE COMPARTMENT ACCESS

TECHNICAL FIELD

This application generally relates to a system and method of limiting access to a secure compartment of a vehicle.

BACKGROUND

Vehicles typically have a storage space behind a rear seat of the vehicle. Sedan vehicles typically have a trunk area and sport utility vehicles (SUVs) typically have a cargo area. Vehicles are typically used by the public. However, some vehicles are used for public service including police, fire, and emergency medical services. Vehicles that are used for public service, also referred to as public service vehicles, may be specially equipped or include special functionality directly installed by a manufacturer of the vehicles to meet the special needs of public service.

SUMMARY

An access system for a vehicle includes a controller. The controller is configured to respond to receiving an unlock signal indicative of an unlock request by causing a compartment closure to unlock for a predetermined time. Upon expiration of the predetermined time, the controller causes the compartment closure to lock. The controller is configured to respond to receiving an unlatch signal indicative of an unlatch request during the predetermined time by causing the compartment closure to unlatch.

An access system for a vehicle includes a controller. The controller is configured to respond to receiving an unlock signal indicative of an unlock request and a vehicle operation signal indicative of a vehicle secure state by causing a compartment closure to unlock for a predetermined time. Upon expiration of the predetermined time, the controller causes the compartment closure to lock. The controller is configured to respond to receiving an unlatch signal indicative of an unlatch request during the predetermined time by causing the compartment closure to unlatch.

A method of controlling access to a vehicle compartment includes receiving an unlock signal and a vehicle operation signal. And unlocking a closure for a compartment for a predetermined time in response to the unlock signal and the vehicle operation signal, and locking the closure after the predetermined time. The method further includes unlatching the closure in response to receiving an unlatch signal during the predetermined time.

DETAILED DESCRIPTION

Figure 1A:
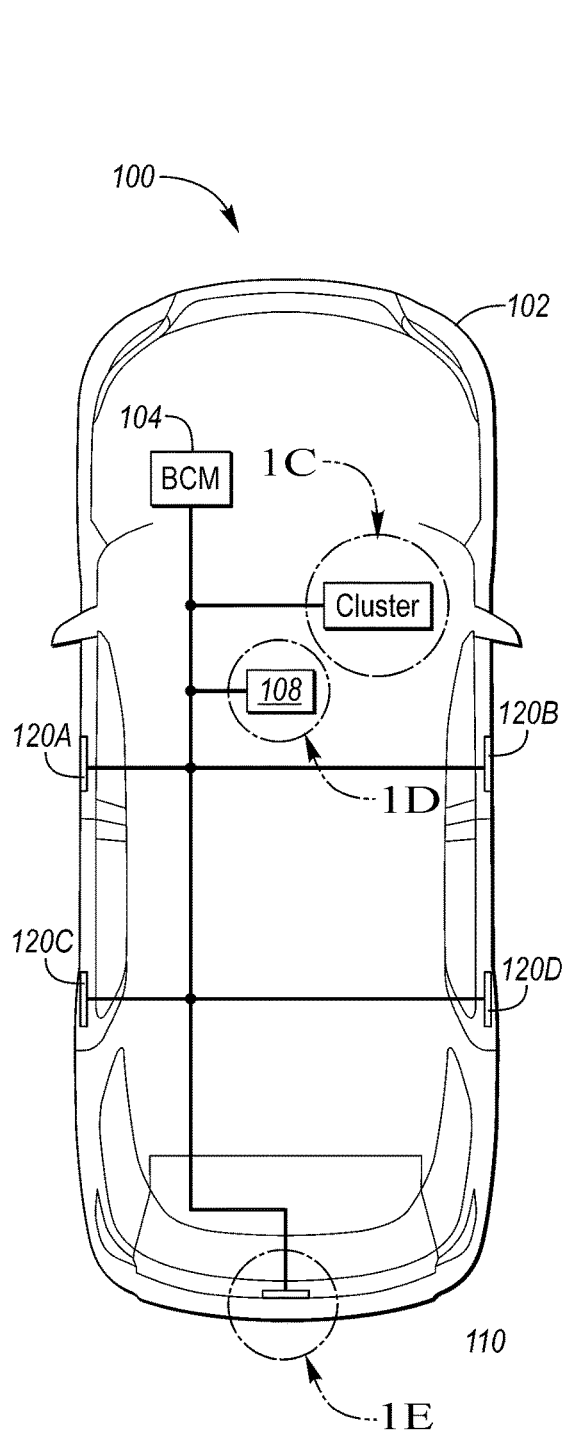
FIGS. 1A, 1B, 1C, 1D and 1E are exemplary diagrams of a vehicle access system.
Figure 1B:
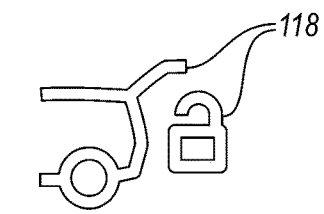
Figure 1C:
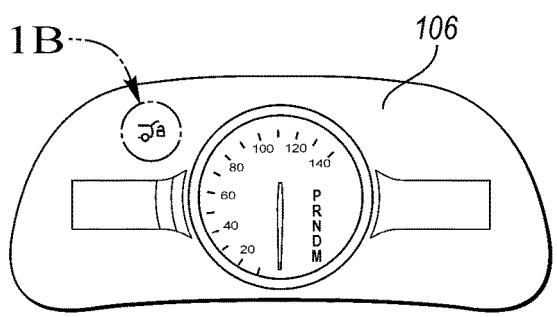
Figure 1D:
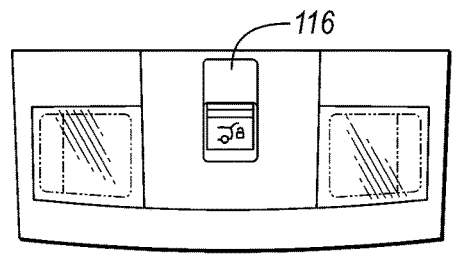
Figure 1E:
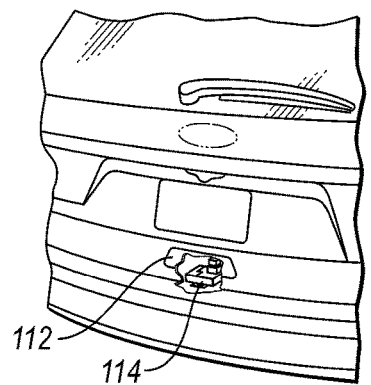

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Some vehicles include a plurality of doors and a secure storage compartment or compartment. The compartment may include a rear cargo area of a vehicle such as a van, SUV, station wagon or hatch back. The rear cargo area typically has a compartment closure such as a lift gate configured to open and close to secure, isolate and protect contents of the rear cargo area. Another example of a compartment is a bed of a pickup truck. The bed may be covered with a truck bed cover also commonly referred to as a truck cap, truck topper, camper shell, truck canopy, and hard tonneau cover. In reference to the covered truck bed, the compartment closure may include the tail gate of the truck. Also, the compartment may include a trunk of a vehicle such as a sedan. The trunk typically has a compartment closure such as a rear deck lid configured to open and close to secure, isolate and protect contents of the trunk. Other examples include an engine compartment in which the closure is a hood and a center console compartment in which that closure is a top.

Many vehicles include electric door locks that lock and unlock the doors in response to a switch on an interior of the vehicle such as an interior door panel switch assembly or a centrally located door panel switch assembly. Alternatively the doors may be locked and unlocked using a physical key or a key fob. The key fob is a remote electronic module that transmits a radio frequency signal to an electronic module in the vehicle including a remote keyless entry (RKE) module, a passive entry passive start (PEPS) module, and a passive anti-theft system (PATS) module. The module then transmits a signal to a main body control module (BCM), in which the signal indicates which door, doors and/or closure to lock/unlock. Typically, the user of a physical key requires the user/operator to physically insert the key into a key slot on the vehicle and rotate the key to unlock the door lock mechanism in which only the door associated with the key slot is locked/unlocked. Once a door lock mechanism is unlocked, the user is then able to unlatch the door using one of a multiple of different implementations that may activate a mechanical or electromechanical mechanism to unlatch the closure. An example mechanical and electromechanical mechanism include a mechanical door handle, an electronic membrane switch or push button associated with a door or a remote sensor associated with a powered mechanism including a power lift gate or power sliding door.

Typically a controller in the vehicle is configured such that a received signal indicative of pressing a door lock button on a key fob locks all vehicle doors including the rear closure. A signal indicative of a single press of a door unlock button on the key fob unlocks the driver door and a signal indicative of the detection of multiple presses of the door unlock button on the key fob unlocks all vehicle doors including the rear closure. Also, the controller in the vehicle is configured such that a signal received indicative of pressing a door lock button on a door panel or an interior panel locks all vehicle doors including the rear closure. And a signal received indicative of a press of a door unlock button on the door panel or an interior panel unlocks all vehicle doors including the rear closure. For example, on a typical SUV when the doors are unlocked using the interior button or double press of the key fob unlock, the lift gate is unlocked and may remain unlocked such that access to the contents is available by opening or unlatching the lift gate.

However, a public service vehicle such as a police, fire department or EMS sport utility vehicle may have a cage between a rear seat and a cargo area. The cargo area may be used to store items that need to be secured such as medicine, equipment, and weapons. It may be desired to limit the time that a rear closure is unlocked to maintain security of the storage compartment contents. The use of a timed unlocking mechanism in which the rear closure is independent of other doors is described. In one exemplary embodiment, the door unlock switches and key fobs do not unlock the rear closure. The only way to unlock the closure is when an ignition is in Run or Start and the rear closure button must be pressed to unlock the rear closure. Then, the rear closure will be unlocked for a predetermined time such as 30, 45, or 60 seconds, and after the predetermined time, the rear closure will relock.

FIGS. 1A, 1B, 1C, 1D and 1E are exemplary diagrams of a vehicle access system 100. The vehicle access system 100 includes a vehicle 102, a body control module (BCM) 104, an instrument cluster 106, a center console 108 and a rear closure 110. The various components discussed may have one or more associated controllers to control and monitor the operation of the components. The controllers may communicate via a serial bus (e.g., J1850, Local Interconnect Network (LIN), Controller Area Network (CAN), Ethernet, and Flexray) or via discrete conductors. The BCM 104 may be present to coordinate the operation of the various components and for simplicity is illustrated as the controller.

The rear closure in this exemplary illustration is a lift gate but in other embodiments may include a rear deck lid of a sedan vehicle, a tail gate of a pickup truck. The lift gate includes an unlatch activation apparatus 112 that may include a sensor, a switch or mechanical handle that is capable of unlatching, either directly or indirectly a closure lock 114. The indirect unlatching includes generating a signal that is received by a controller such as a BCM 104, wherein the BCM 104 generates an unlatch signal to unlatch the closure lock 114. The unlatch signal in this example is only generated when the rear closure 110 is unlocked.

The rear closure 110 is unlocked in response to the controller, such as the BCM 104, receiving an unlock signal from a compartment unlock apparatus. Examples of a compartment unlock apparatus include an interior switch 116, an interior sensor, an interior keypad, and a key fob unlock button. The compartment unlock apparatus may be configured such that activation of the apparatus may occur at any point in time, or the apparatus may only be activated when the vehicle is in a secured state. An example of a secured state is a key in a vehicle ignition and the ignition is in a run or start state. Or if the vehicle has a passive entry passive start module, if a key fob is detected in an area of the driver seat. Another example of a secured state is a key fob being detected to be within a predetermined distance from the vehicle and the predetermined distance being less than a RF range of the key fob. For example, the predetermined range may be 10 meters and the RF range of the key fob may be 100 meters.

The compartment unlock apparatus, shown here as an interior switch 116, may also include a keypad. The keypad may include an array of switches or it may be associated with a touchpad. In the example of a keypad, the unlock signal may be indicative of a sequence of characters entered on the keypad in which the unlock request is the sequence of characters equal to an unlock sequence of characters. This may include a series of multiple characters (e.g., 4 characters) or it may be multiple characters entered at once (e.g., pressing a '1', '3', and '5' key on a numeric keypad simultaneously) or a combination of both.

When an unlock request is generated, an alert or tell-tale 118 may be illuminated on the instrument cluster 106. The unlock request may provide a window at which the rear closure is unlocked. For example, when an unlock request is received, the controller may unlock rear closure 110 for a predetermined time (e.g., 30, 45, or 60 seconds) after which the controller may lock the rear closure 110. During the predetermined time, (i.e., the rear closure 110 is unlocked) the controller will unlatch the rear closure 110 if an unlatch request is received. If an unlatch request is received after the predetermined time, the controller will not unlatch the rear closure 110.

In this example, a signal from a key fob to unlock doors 120 of the vehicle 102 will not unlock the rear closure 110. This exemplary illustration is for a rear closure, but in an alternative embodiment, the system and methods may also be used for an interior compartment such as a center console having a top or lid, or a weapon mount system using an electromagnetic locking structure. Similar to the rear closure, the console would only be unlatched or the weapon mount system would only release the weapon if the proper unlock signal is received and the unlatch/release occurred within a predetermined time of the unlock signal. The conditions for allowing console unlatch or weapon mount release would be similar to the rear closure conditions. For example, the vehicle would need to be in a secured state (e.g. ignition in Run/Start). Also, the method for providing the unlock could be any one of the methods described for the rear closure unlock (interior switch, keypad, key fob, etc). The use of the key fob may include an operational band or range that the key fob may be used. If the key fob is within the band, a predetermined range from the vehicle, the key fob may activate the rear closure unlock. Also, if the key fob is detected to be within a proximate distance (e.g. within a few feet of the rear closure), the key fob may activate the rear closure unlock. The detection may use triangulation of the RF signals from the key fob. If the key fob is outside the band or farther from the vehicle than the predetermined range, the use of the key fob may be disabled.

Figure 2:
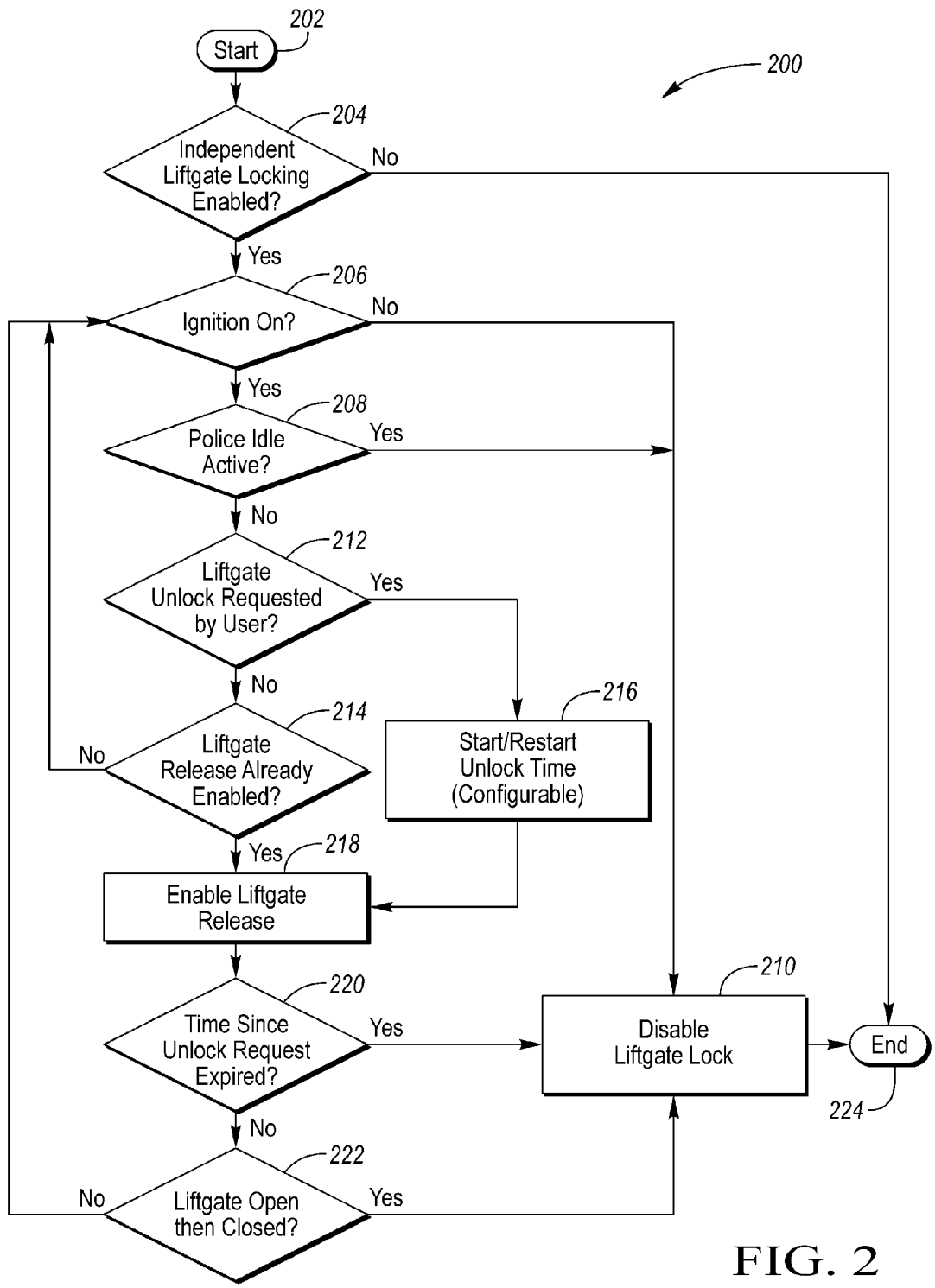
FIG. 2 is an exemplary flow diagram of a timed independent secure compartment access system.

FIG. 2 is an exemplary flow diagram 200 of a timed independent secure compartment access system. The flow diagram begins execution at block 202. A controller checks a parameter, variable, or configuration code in block 204. If the parameter, variable, or configuration code is indicative of independent compartment locking, the controller proceeds to check if the vehicle is in a secure state in block 206. An example of a secured state is a key in a vehicle ignition and the ignition is in a run or start state. Or if the vehicle has a passive entry passive start module, if a key fob is detected in an area of the driver seat. Another example of a secured state is a key fob being detected to be within a predetermined distance from the vehicle and the predetermined distance being less than an RF range of the key fob. For example, the predetermined range may be 10 meters and the RF range of the key fob may be 100 meters. The controller then determines if police idle is active in block 208, if the vehicle is not in a secure state or if police idle is active, the controller disables the compartment lock by locking the compartment in block 210.

The police idle check in block 208 is part of determining whether the vehicle is in a secured state. Police idle is a mode of operation of the system that allows a police officer to arm the system via an apparatus including a pushbutton, a sensor, or RF receiver while the ignition is on and the engine is running If police idle is armed, also referred to as police idle active mode, when the ignition is turned off, the engine continues to run allowing the officer to secure the vehicle from being driven while allowing the engine to continue to run to provide power to accessory equipment. During police idle active mode, it may be desirable to have the rear cargo area secured. When the police officer re-inserts a key and turns the ignition back to an on position, police idle is de-activated. If the vehicle is not in police idle, the controller then determines if a compartment unlock request is received in block 212. If a compartment unlock signal is not received by the controller, the controller checks if the rear closure release is already enabled in block 214. The decision tree of block 214 is a check to determine if a compartment unlock request by the user has occurred, and if so, a check if the time has expired or if the rear cargo door has been opened and closed. If the user had not previously requested a compartment unlock request, continue to monitor that the vehicle is still in a secure state.

If a compartment unlock signal is received by the controller, the controller starts a timer based on a predetermined time in block 216. If the controller receives an unlock signal indicative of a rear closure unlock request and an unlatch signal indicative of a rear closure unlatch request, in which the unlatch signal is received while the unlock timer or predetermined time has not expired, the controller will unlatch the rear closure in block 218. The controller will then check if the unlock timer or predetermined time has expired in block 220. If the timer has expired, the controller will disable the unlock signal in block 210. If the timer has not expired, the controller checks if the rear closure has been opened and closed in block 222. If the rear closure has been opened and closed, the controller will lock the compartment in block 210. If the rear closure has not been opened and closed, the controller will loop back to block 206 to continue to monitor that the vehicle remains in a secured state.

An alternative embodiment includes a parameter associated with the predetermined time such that the manufacturer, a mechanic, or an agency can set the parameter to a time selected from a plurality of times (e.g., 15, 30, 45, 60 seconds).

Another alternative embodiment includes a parameter to disable unlocking the rear closure such that the only way to enter the lift gate is via a mechanical apparatus including a physical key turning a lock cylinder in a lift gate.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An access system for a vehicle comprising:
   a controller configured to,
      in response to receiving an unlock signal indicative of an authorized unlock request, cause a compartment closure to unlock for a predetermined time and, upon expiration of the predetermined time, cause the compartment closure to lock, and
      in response to receiving an unlatch signal indicative of an unlatch request during the predetermined time, cause the compartment closure to unlatch.

2. The system of claim 1, wherein the unlock signal is indicative of a sequence of characters entered on a keypad.

3. The system of claim 1, wherein the compartment closure is a rear deck lid of a trunk compartment.

4. The system of claim 1, wherein the compartment closure is a rear lift gate of a rear cargo area.

5. The system of claim 1, wherein the unlatch signal is from a membrane switch disposed on an exterior surface of the compartment closure.

6. The system of claim 1, wherein the predetermined time is 30 seconds or less.

7. An access system for a vehicle comprising:
   a controller configured to,
      in response to receiving an unlock signal indicative of an authorized unlock request and a vehicle operation signal indicative of a vehicle secure state, cause a compartment closure to unlock for a predetermined time and, upon expiration of the predetermined time, cause the compartment closure to lock, and
      in response to receiving an unlatch signal indicative of an unlatch request during the predetermined time, cause the compartment closure to unlatch.

8. The vehicle of claim 7, wherein the vehicle operation signal is an ignition signal and the vehicle secured state is a run state or a start state.

9. The vehicle of claim 7, wherein the vehicle operation signal is a proximity detection signal from a passive entry passive start module and the vehicle secured state is a detection of a key fob within a predetermined distance from the vehicle, wherein the predetermined distance is less than a RF range of the key fob.

10. The vehicle of claim 9, wherein the unlock signal is a RF signal received by the controller indicative of activation of a button of a key fob for the vehicle.

11. The system of claim 7, wherein the compartment closure is a rear deck lid of a trunk compartment.

12. The system of claim 7, wherein the compartment closure is a rear lift gate of a rear cargo area.

13. The system of claim 7, wherein the unlatch signal is from a membrane switch disposed on an exterior surface of the compartment closure.

14. The system of claim 7, wherein the unlock signal is indicative of a sequence of characters entered on a keypad.

15. The system of claim 7, wherein the compartment is a center console and the compartment closure is a lid of the center console including a locking mechanism, wherein the compartment unlock signal is received from a switch located on a dashboard of the vehicle and the compartment unlatch signal is located on the center console.

16. A method of controlling access to a vehicle compartment comprising:
receiving an authorized unlock signal and a vehicle operation signal;
unlocking a closure for a compartment for a predetermined time in response to the unlock signal and the vehicle operation signal, and locking the closure after the predetermined time; and
unlatching the closure in response to receiving an unlatch signal during the predetermined time.

17. The method of claim 16, wherein receiving the vehicle operation signal includes receiving a proximity detection signal from a passive entry passive start module and unlocking the closure is in response to the vehicle operation signal being in a vehicle secured state, and wherein the vehicle secured state is a detection of a key fob within a predetermined distance from the vehicle that is less than a RF range of the key fob.

18. The method of claim 17, wherein the unlock signal is a RF signal received by the controller indicative of activation of a button of a key fob for the vehicle.

* * * * *